United States Patent
Yamamoto et al.

(10) Patent No.: US 8,597,842 B2
(45) Date of Patent: Dec. 3, 2013

(54) FUEL CELL MODULE

(75) Inventors: Jun Yamamoto, Wako (JP); Bunichi Saito, Wako (JP); Yukihiko Kiyohiro, Wako (JP); Koji Dan, Wako (JP); Hiroki Homma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 662 days.

(21) Appl. No.: 12/682,845

(22) PCT Filed: Oct. 16, 2008

(86) PCT No.: PCT/JP2008/069170
§ 371 (c)(1),
(2), (4) Date: Apr. 13, 2010

(87) PCT Pub. No.: WO2009/051269
PCT Pub. Date: Apr. 23, 2009

(65) Prior Publication Data
US 2010/0227233 A1    Sep. 9, 2010

(30) Foreign Application Priority Data

Oct. 18, 2007   (JP) .................................. 2007-271054

(51) Int. Cl.
H01M 8/02   (2006.01)
H01M 8/04   (2006.01)
H01M 8/10   (2006.01)

(52) U.S. Cl.
USPC ........... 429/433; 429/441; 429/423; 429/434; 429/436

(58) Field of Classification Search
USPC ............. 429/20, 26, 452, 471, 435, 507, 469, 429/467
See application file for complete search history.

(56) References Cited

U.S. PATENT DOCUMENTS

| 2003/0134169 A1 | 7/2003 | Sarkar et al. |
| 2003/0235725 A1 | 12/2003 | Haltiner et al. |
| 2005/0191534 A1* | 9/2005 | Kim et al. ........................ 429/20 |

(Continued)

FOREIGN PATENT DOCUMENTS

| JP | 2001-68135 | 3/2001 |
| JP | 2003-151610 | 5/2003 |

(Continued)

OTHER PUBLICATIONS

Machine translation of JP 2003151610 (published May 2003), 6 pages.*
International Search Report for Application No. PCT/JP2008/069170, dated Jan. 20, 2009.

*Primary Examiner* — Basia Ridley
*Assistant Examiner* — Caitlin Wilmot
(74) *Attorney, Agent, or Firm* — Nelson Mullins Riley & Scarborough LLP; Anthony A. Laurentano

(57) ABSTRACT

A fuel cell module includes a fuel cell stack, a heat exchanger, an evaporator, a reformer, and a combustor for at least heating any of the fuel cell stack, the heat exchanger, the evaporator, and the reformer. The fuel cell module is surrounded by an inner heat insulating layer and an outer heat insulating layer. The inner heat insulating layer is used in a high temperature area, and the outer heat insulating layer is used in a low temperature area. The inner heat insulating layer contains a large amount of metal component in comparison with the outer heat insulating layer.

9 Claims, 11 Drawing Sheets

(56) References Cited

U.S. PATENT DOCUMENTS

2005/0194123 A1   9/2005  Strahle et al.
2006/0246333 A1*  11/2006 Schaevitz et al. ............... 429/26
2006/0292432 A1*  12/2006 Ogawa et al. ................... 429/38
2007/0148502 A1   6/2007  Terazaki

FOREIGN PATENT DOCUMENTS

| JP | 2004-87362 | 3/2004 |
| JP | 2005-194123 | 7/2005 |
| WO | 2006/116638 A2 | 11/2006 |

* cited by examiner

FIG. 3

| INNER HEAT INSULATING LAYER 70 | MICROTHERM MICROTHERM PRODUCT | BTU-BLOCK THERMAL CERAMIC PRODUCT | WDS Porextherm PRODUCT |
|---|---|---|---|
| OUTER HEAT INSULATING LAYER 72 | CERAMIC COVER CC100 | VIGLASS KURABO PRODUCT | Hi-VIP HITACHI PRODUCT |

— → EXHAUST GAS
— → AIR
— → RAW FUEL (REFORMED GAS)

---→ EXHAUST GAS
—→ AIR
—·—→ RAW FUEL (REFORMED GAS)

US 8,597,842 B2

FUEL CELL MODULE

RELATED APPLICATIONS

This application is a 35 U.S.C. 371 national stage filing of International Application No. PCT/JP2008/069170, filed Oct. 16, 2008, which claims priority to Japanese Patent Application No. 2007-271054 filed on Oct. 18, 2007 in Japan. The contents of the aforementioned applications are hereby incorporated by reference.

TECHNICAL FIELD

The present invention relates to a fuel cell module including a fuel cell stack, a heat exchanger, an evaporator, a reformer, and a combustor. The fuel cell stack is formed by stacking a plurality of fuel cells. The heat exchanger heats an oxygen-containing gas before the oxygen-containing gas is supplied to the fuel cell stack. The evaporator produces a mixed fuel of a raw fuel chiefly containing hydrocarbon and water vapor obtained by evaporating water. The reformer produces a reformed gas by reforming the mixed fuel. The combustor at least heats any of the fuel cell stack, the heat exchanger, the evaporator, and the reformer.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (MEA). The electrolyte electrode assembly is interposed between separators (bipolar plates). In use, normally, predetermined numbers of the electrolyte electrode assemblies and the separators are stacked together to form a fuel cell stack.

As the fuel gas supplied to the solid oxide fuel cell, normally, a hydrogen gas, Co, or methane generated from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas). The operating temperature of the solid oxide fuel cell is high, at the temperature of several hundred ° C. (e.g., about 600° C. to 800° C.). Therefore, radiation of the heat to the outside becomes large, and heat efficiency is lowered. Further, heat insulating capacity (volume) for containing the solid oxide fuel cell in a thermally insulated state becomes significantly large, and the cost for heat insulation becomes high.

In an attempt to address the problem, for example, Japanese Laid-Open Patent Publication No. 2001-068135 discloses a fuel cell reforming system as shown in FIG. 9. The fuel cell reforming system includes a reformer 1a, a high temperature shift reactor 2a, a low temperature shift reactor 3a, and a selective oxidizer 4a, and these components are covered by separate pieces of inner heat insulating material 5a. The respective pieces of inner heat insulating material 5a are covered by outer heat insulating material 6a, and a heat collection heat exchanger 7a for collecting the waste heat of the respective reactors (1a, 2a, 3a, 4a) is provided inside the outer heat insulating material 6a.

Further, as shown in FIG. 10, a fuel cell power generation system disclosed in Japanese Laid-Open Patent Publication No. 2004-087362 includes a fuel cell 1b, a reformer 2b for reforming a fuel gas supplied to the fuel cell 1b, a combustor for burning an exhaust fuel gas from the fuel cell 1b, and a heat collection heat exchanger 4b for performing heat exchange between the combustion exhaust gas from the combustor 3b and the air to be supplied to the fuel cell 1b.

The fuel cell 1b, the reformer 2b, the combustor 3b, and the heat collection heat exchanger 4b are disposed in a casing 5b, and the casing 5b is made of heat insulating material. The casing 5b includes a casing body 6b and a heat insulating layer 7b covering the casing body 6b. The casing body 6b is made of high temperature heat insulating material, and the heat insulating layer 7b is made of heat insulating material having small heat conductance in comparison with the high temperature heat insulating material of the casing body 6b.

Further, as shown in FIG. 11, heat insulating container structure disclosed in Japanese Laid-Open Patent Publication No. 2005-194123 has dual structure where a container is includes an inner heat insulating layer 2c and an outer heat insulating layer 3c. A channel 4c as a passage of a combustion gas produced by burning a fuel using the combustion air is formed inside the inner heat insulating layer 2c, and a supply channel 5c for the combustion air is formed between the inner heat insulating layer 2c and the outer heat insulating layer 3c. A reformer 6c and a combustor 7c are provided in the channel 4c. The combustion air which flows into the supply channel 5c is heated by the combustion gas in the channel 4c, and then supplied to the area inside the inner heat insulating layer 2c.

However, in Japanese Laid-Open Patent Publication No. 2001-068135, the reformer 1a, the high temperature shift reactor 2a, the low temperature shift reactor 3a, and the selective oxidizer 4a are covered by the separate pieces of the inner heat insulating material 5a. Therefore, the fuel cell reforming system has complicated structure, and the production cost becomes high. Further, since the inner heat insulating material 5a and the outer heat insulating material 6a do not have different capabilities depending on the functions of the units to be covered, improvement in the overall heat efficiency in the reforming system cannot be achieved.

Further, in Japanese Laid-Open Patent Publication No. 2004-087362, there is large space between the fuel cell 1b as a high temperature apparatus, the reformer 2b, the heat collection heat exchanger 4b, and the casing body 6b. Therefore, in the casing body 6b, convection flows are generated easily, and thus, heat radiation may be facilitated undesirably. Further, though the relationship of the heat conductance between the casing body 6b and the heat insulating layer 7b is disclosed, in particular, it is not possible to suppress heat radiation from the high temperature apparatus.

Further, in Japanese Laid-Open Patent Publication No. 2005-194123, the inner heat insulating layer 2c and the outer heat insulating layer 3c of the container 1c simply have the heat insulating capability. Therefore, in particular, it is not possible to suppress radiation of heat from the reformer 6c and the combustor 7c, and reduction in the heat insulating capacity cannot be reduced.

The above and other objects, features and advantages of the present invention will become more apparent from the following description when taken in conjunction with the accompanying drawings in which preferred embodiments of the present invention are shown by way of illustrative example.

DISCLOSURE OF INVENTION

The present invention has been made to solve the problem of this type, and an object of the present invention is to provide a fuel cell module which makes it possible to prevent heat from excessively being released from a heat generating portion, achieve reduction in the heat insulating capacity and the production cost, facilitate thermally self-sustained operation, and improve the heat efficiency.

The present invention relates to a fuel cell module including a fuel cell stack, a heat exchanger, an evaporator, a reformer, and a combustor. The fuel cell stack is formed by stacking a plurality of fuel cells. Each of the fuel cells is formed by stacking an electrolyte electrode assembly and a separator. The electrolyte electrode assembly includes an anode, a cathode, and an electrolyte interposed between the anode and the cathode. The heat exchanger heats an oxygen-containing gas before the oxygen-containing gas is supplied to the fuel cell stack. The evaporator produces a mixed fuel of a raw fuel chiefly containing hydrocarbon and water vapor obtained by evaporating water. The reformer produces a reformed gas by reforming the mixed fuel. The combustor at least heats any of the fuel cell stack, the heat exchanger, the evaporator, and the reformer.

The fuel cell module is surrounded by a plurality of heat insulating layers. The heat insulating layers include an inner heat insulating layer and an outer heat insulating layer, and the inner heat insulating layer contains a large amount of metal component in comparison with the outer heat insulating layer.

In the present invention, the fuel cell module is surrounded by a plurality of heat insulating layers including an inner heat insulating layer and an outer heat insulating layer, and the inner heat insulating layer contains a large amount of metal component in comparison with the outer heat insulating layer. In the structure, the inner heat insulating layer containing the large amount of metal component can suppress radiation of heat from the high temperature area, and the outer heat insulating layer having the small amount of metal component can suppress heat conductance in the low temperature area. Thus, in the inner heat insulating layer and the outer heat insulating layer, it is possible to achieve the optimum heat insulation in the respective temperature areas. It is possible to reliably achieve reduction of heat radiation from the fuel cell module, facilitate thermally self-sustaining operation, improve the heat efficiency, reduce the volume in the heat insulating layer, and reduce the production cost.

BRIEF DESCRIPTION OF DRAWINGS

FIG. 3 is a table showing examples of material used for an inner heat insulating layer and an outer heat insulating layer of the fuel cell module;

BEST MODE FOR CARRYING OUT THE INVENTION

Figure 1:
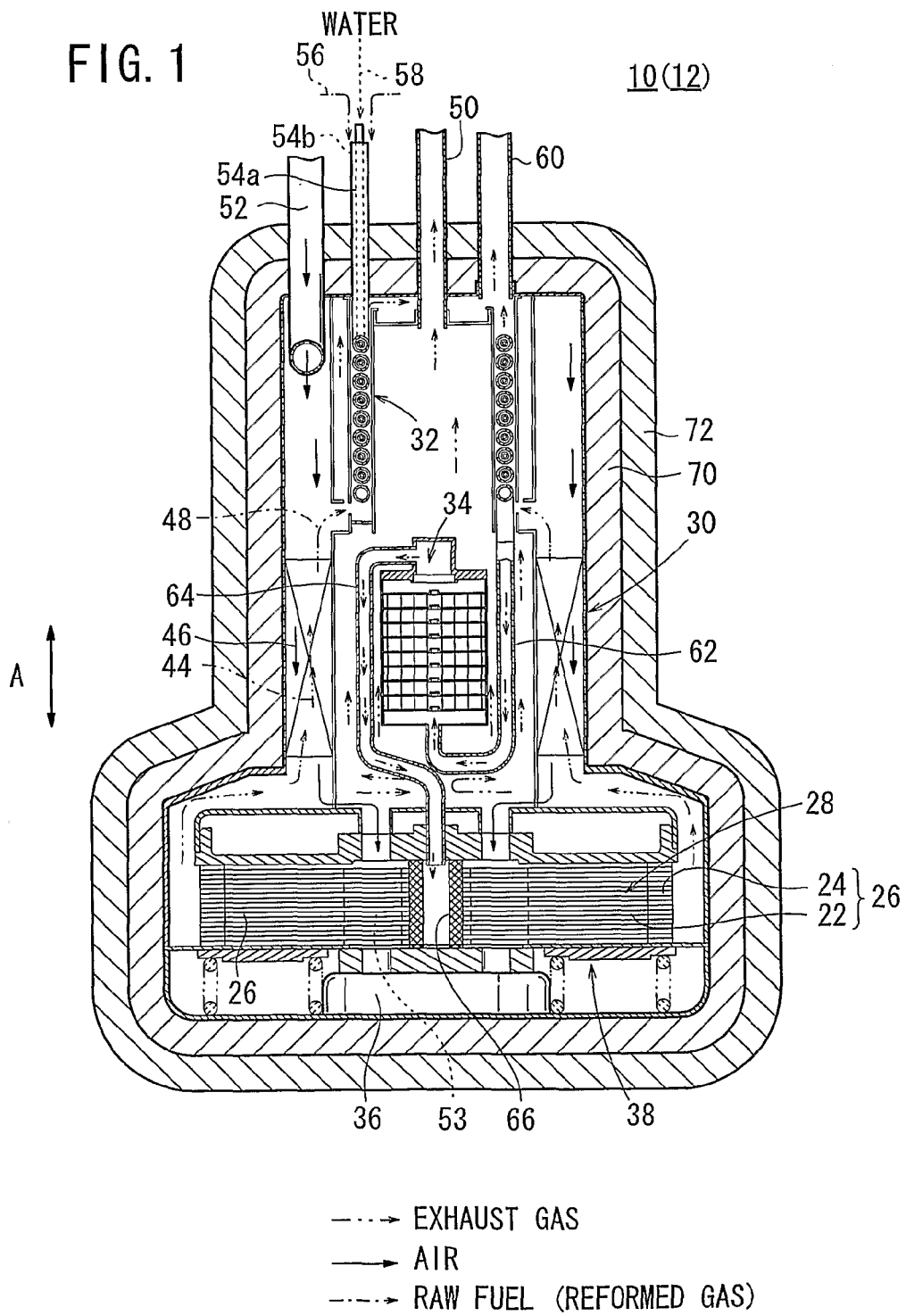
FIG. 1 is a cross sectional view showing a fuel cell module according to a first embodiment of the present invention.
Figure 2:
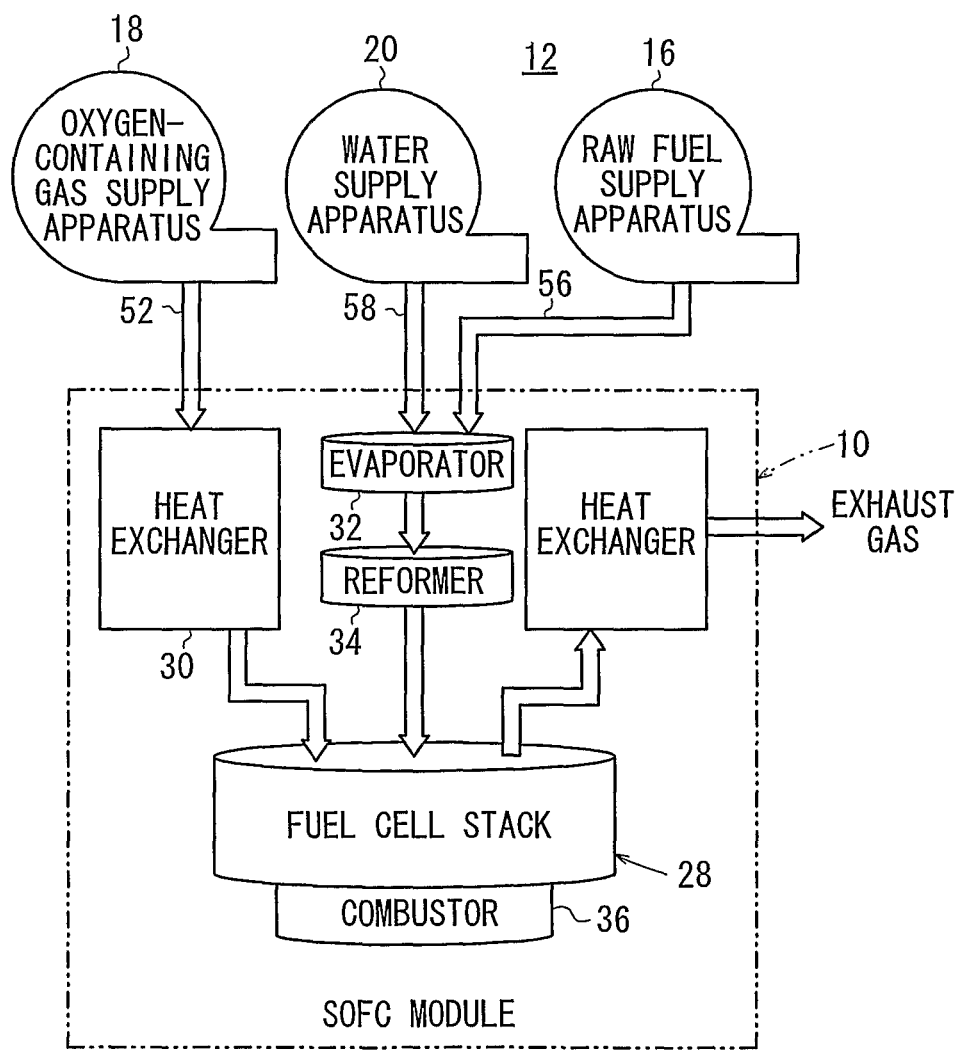
FIG. 2 is a diagram schematically showing structure of a mechanical circuit of a fuel cell system including the fuel cell module.

FIG. 1 is a cross sectional view showing a fuel cell module 10 according to a first embodiment of the present invention. FIG. 2 is a diagram schematically showing structure of a mechanical circuit of a fuel cell system 12 including the fuel cell module 10.

The fuel cell system 12 is used in various applications, including stationary and mobile applications. For example, the fuel cell system 12 is mounted on a vehicle. The fuel cell system 12 includes a fuel cell module (SOFC module) 10 for generating electrical energy in power generation by electrochemical reactions of a fuel gas (hydrogen gas) and an oxygen-containing gas (air), a raw fuel supply apparatus (including a fuel gas pump) 16 for supplying a raw fuel (e.g., city gas) to the fuel cell module 10, an oxygen-containing gas supply apparatus (including an air pump) 18 for supplying an oxygen-containing gas to the fuel cell module 10, and a water supply apparatus (including a water pump) 20 for supplying water to the fuel cell module 10.

The fuel cell module 10 includes a fuel cell stack 28 formed by stacking a plurality of solid oxide fuel cells 26 in a vertical direction. The fuel cells 26 are formed by stacking electrolyte electrode assemblies 22 and separators 24. Though not shown, each of the electrolyte electrode assemblies 22 includes a cathode, an anode, and an electrolyte (solid oxide) interposed between the cathode and the anode. For example, the electrolyte is made of ion-conductive solid oxide such as stabilized zirconia.

At an upper (or lower) end of the fuel cell stack 28 in the stacking direction, a heat exchanger 30 for heating the oxygen-containing gas before the oxygen-containing gas is supplied to the fuel cell stack 28, an evaporator 32 for evaporating water to produce a mixed fuel of the raw fuel and water vapor, and a reformer 34 for reforming the mixed fuel to produce a reformed gas are provided.

At a lower (or upper) end of the fuel cell stack 28 in the stacking direction, a load applying mechanism 38 for applying a tightening load in the direction indicated by the arrow A to at least the fuel cell stack 28, and a combustor 36 for heating the evaporator 32 or the reformer 34, and the fuel cells 26 of the fuel cell stack 28 is provided.

The reformer 34 is a preliminary reformer for reforming higher hydrocarbon ($C_{2+}$) such as ethane ($C_2H_6$), propane ($C_3H_8$), and butane ($C_4H_{10}$) in the city gas (raw fuel), into a fuel gas chiefly containing methane ($CH_4$), hydrogen and CO by steam reforming. The operating temperature of the reformer 34 is several hundred ° C.

The operating temperature of the fuel cell 26 is high, at several hundred ° C. In the electrolyte electrode assembly 22, methane in the fuel gas is reformed to obtain hydrogen and CO, and the hydrogen and CO are supplied to the anode.

As shown in FIG. 1, the heat exchanger 30 has a first exhaust gas channel 44 as a passage for a consumed reactant gas discharged from the fuel cell stack 28 (hereinafter also referred to as the exhaust gas or the combustion exhaust gas) and an air channel 46 as a passage for the air for allowing the air as a cooling medium (heated fluid) and the exhaust gas to flow in a counterflow manner. The first exhaust gas channel 44 is connected to a second exhaust gas channel 48 for supplying the exhaust gas to the evaporator 32 as a heat source for evaporating water. The first exhaust gas channel 44 is connected to an exhaust gas pipe 50. The upstream side of the air channel 46 is connected to an air supply pipe 52, and the downstream side of the air channel 46 is connected to an oxygen-containing gas supply passage 53 of the fuel cell stack 28.

The evaporator 32 has dual pipe structure including an outer pipe member 54a and an inner pipe member 54b provided coaxially. The dual pipe is provided in the second exhaust gas channel 48. A raw fuel channel 56 is formed between the outer pipe member 54a and the inner pipe member 54b. Further, a water channel 58 is formed in the inner pipe member 54b. The second exhaust gas channel 48 of the evaporator 32 is connected to a main exhaust pipe 60.

The outer pipe member 54a is connected to a mixed fuel supply pipe 62 coupled to an inlet of the reformer 34. One end of a reformed gas supply channel 64 is coupled to an outlet of the reformer 34, and the other end of the reformed gas supply channel 64 is connected to the fuel gas supply passage 66 of the fuel cell stack 28. Instead of the dual pipe structure, the evaporator 32 may include a heater and a mixer (e.g., ejector type mixer).

As shown in FIG. 2, the raw fuel supply apparatus 16 is connected to the raw fuel channel 56. The oxygen-containing gas supply apparatus 18 is connected to the air supply pipe 52, and the water supply apparatus 20 is connected to the water channel 58.

As shown in FIG. 1, the fuel cell module 10 is surrounded by a plurality of heat insulating layers. In the first embodiment, the fuel cell module 10 is surrounded by the inner heat insulating layer 70 and the outer heat insulating layer 72. The inner heat insulating layer 70 is used in a high temperature area, and the outer heat insulating layer 72 is used in a low temperature area. For example, the inner heat insulating layer 70 contains a large amount of metal component in comparison with the outer heat insulating layer 72.

Specifically, the inner heat insulating layer 70 contains $TiO_2$ (titanium oxide), $Al_2O_3$ (alumina), Ag (silver) or the like, and the inner heat insulating layer 70 is made of dense material in comparison with the outer heat insulating layer 72. The outer heat insulating layer 72 adopts vacuum or porous structure. As the inner heat insulating layer 70 and the outer heat insulating layer 72, for example, various products as shown in FIG. 3 may be used.

Operation of the fuel cell module 10 will be described below.

As shown in FIG. 2, by operation of the raw fuel supply apparatus 16, for example, a raw fuel such as the city gas (including $CH_4$, $C_2H_6$, $C_3H_8$, $C_4H_{10}$) is supplied to the raw fuel channel 56. Further, by operation of the water supply apparatus 20, water is supplied to the water channel 58, and the oxygen-containing gas such as the air is supplied to the air supply pipe 52 through the oxygen-containing gas supply apparatus 18.

As shown in FIG. 1, in the evaporator 32, the raw fuel flowing through the raw fuel channel 56 is mixed with the water vapor, and a mixed fuel is obtained. The mixed fuel is supplied to the inlet of the reformer 34 through the mixed fuel supply pipe 62. The mixed fuel undergoes steam reforming in the reformer 34. Thus, hydrocarbon of $C_{2+}$ is removed (reformed), and a reformed gas chiefly containing methane is obtained. The reformed gas flows through the reformed gas supply channel 64 connected to the outlet of the reformer 34, and supplied to the fuel gas supply passage 66 of the fuel cell stack 28. Thus, the methane in the reformed gas is reformed, and the hydrogen gas and CO are obtained. The fuel gas (reformed gas) chiefly containing the hydrogen gas and CO is supplied to the anode (not shown).

The air supplied from the air supply pipe 52 to the heat exchanger 30 moves along the air channel 46 in the heat exchanger 30, while being heated to a predetermined temperature by heat exchange with the exhaust gas moving along the first exhaust gas channel 44. The air heated by the heat exchanger 30 is supplied to the oxygen-containing gas supply passage 53 of the fuel cell stack 28, and the air is supplied to the cathode (not shown).

Thus, in the electrolyte electrode assembly 22, by electrochemical reactions of the fuel gas and the air, power generation is performed. The hot exhaust gas (several hundred ° C.) discharged to the outer circumferential region of each of the electrolyte electrode assemblies 22 flows through the first exhaust gas channel 44 of the heat exchanger 30, and heat exchange with the air is carried out. The air is heated to a predetermined temperature, and the temperature of the exhaust gas is decreased.

When the exhaust gas moves along the second exhaust gas channel 48, the water passing through the water channel 58 is evaporated. After the exhaust gas passes through the evaporator 32, the exhaust gas is discharged to the outside through the main exhaust pipe 60.

In the first embodiment, as shown in FIG. 1, the fuel cell module 10 is surrounded by the plurality of heat insulating layers, i.e., the inner heat insulating layer 70 and the outer heat insulating layer 72. The inner heat insulating layer 70 contains a large amount of metal component in comparison with the outer heat insulating layer 72.

The inner heat insulating layer 70 directly surrounds the fuel cell module 10, and forms a heat insulating layer in the high temperature area. The outer heat insulating layer 72 is provided outside the inner heat insulating layer 70, and forms a heat insulating layer in the low temperature area. In the structure, the inner heat insulating layer 70 having the large amount of metal component can suppress radiation of heat from the high temperature area due to operation of the fuel cell module 10, and the outer heat insulating layer 72 having the small amount of metal component can suppress heat conductance in the low temperature area.

Thus, in the inner heat insulating layer 70 and the outer heat insulating layer 72, it is possible to achieve the optimum heat insulation in the respective temperature areas. It is possible to reliably achieve reduction in heat radiation from the fuel cell module 10, facilitate thermally self-sustaining operation, improve the heat efficiency, reduce the volume in the heat insulating layer, and reduce the production cost.

Further, the inner heat insulating layer 70 is made of dense material in comparison with the outer heat insulating layer 72. In the structure, the inner heat insulating layer 70 of the dense material can further suppress radiation of heat from the high temperature area, and the outer heat insulating layer 72 having vacuum or porous structure can further suppress heat conductance in the low temperature area.

Figure 4:
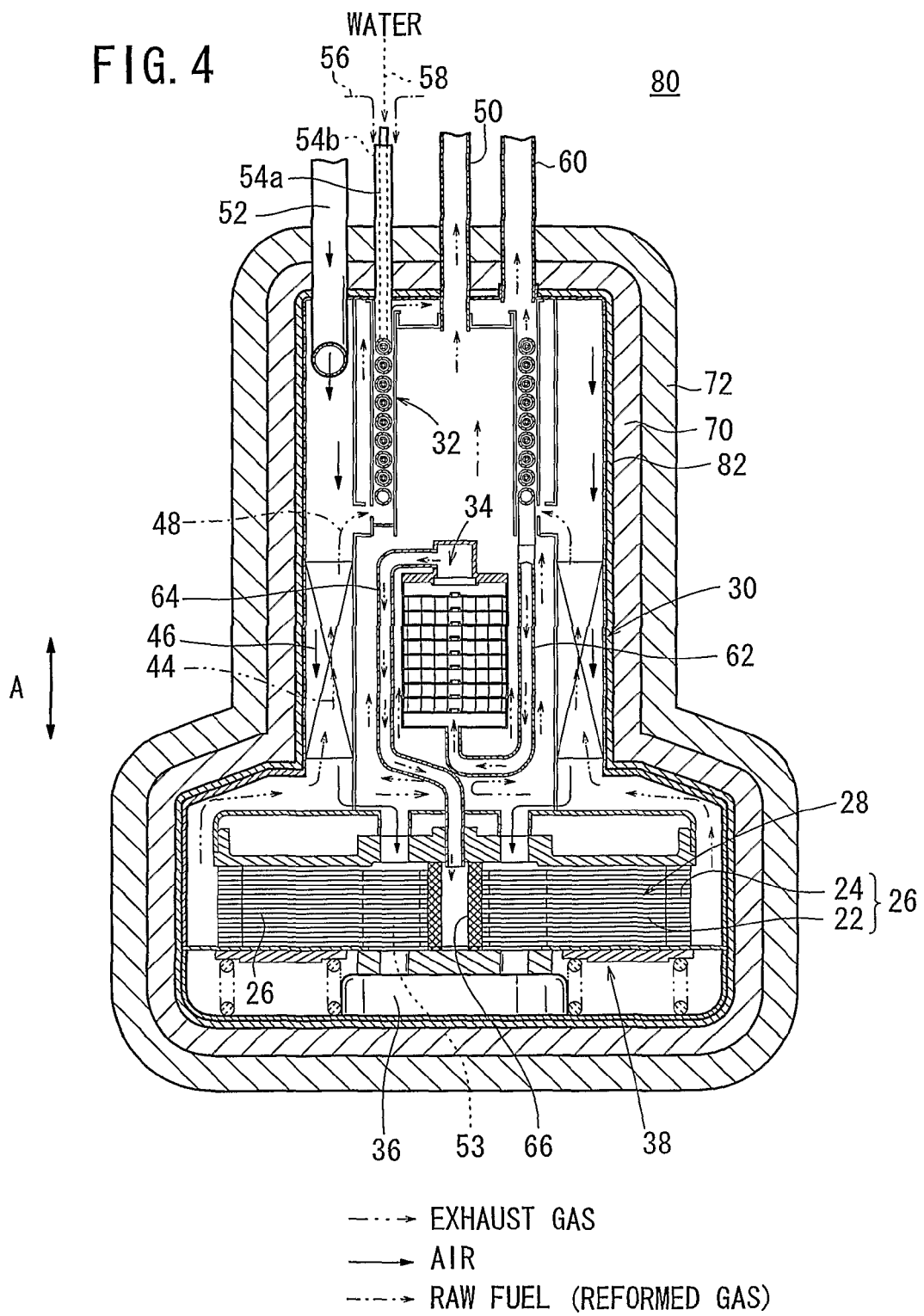
FIG. 4 is a cross sectional view showing a fuel cell module according to a second embodiment of the present invention.

FIG. 4 is a cross sectional view showing a fuel cell module according to a second embodiment of the present invention. The constituent elements that are identical to those of the fuel cell module 10 according to the first embodiment are labeled with the same reference numeral, and description thereof will be omitted. Further, in third to sixth embodiments as described later, the constituent elements that are identical to those of the fuel cell module 10 according to the first embodiment are labeled with the same reference numeral, and detailed description thereof will be omitted.

The fuel cell module 80 is surrounded by a plurality of layers including a metal plating layer 82, the inner heat insulating layer 70, and the outer heat insulating layer 72. For example, the metal plating layer 82 may be a silver plating layer or an aluminum plating layer.

In the second embodiment, the metal plating layer 82 is provided around the fuel cell module 80. Therefore, by the metal plating layer 82, it is possible to further suppress radiation of heat from the high temperature area.

In the second embodiment, the fuel cell module 80 is surrounded by three insulating layers, i.e., the metal plating layer 82, the inner heat insulating layer 70, and the outer heat insulating layer 72. However, the present invention is not limited in this respect. For example, four or more heat insulating layers may be provided.

Figure 5:
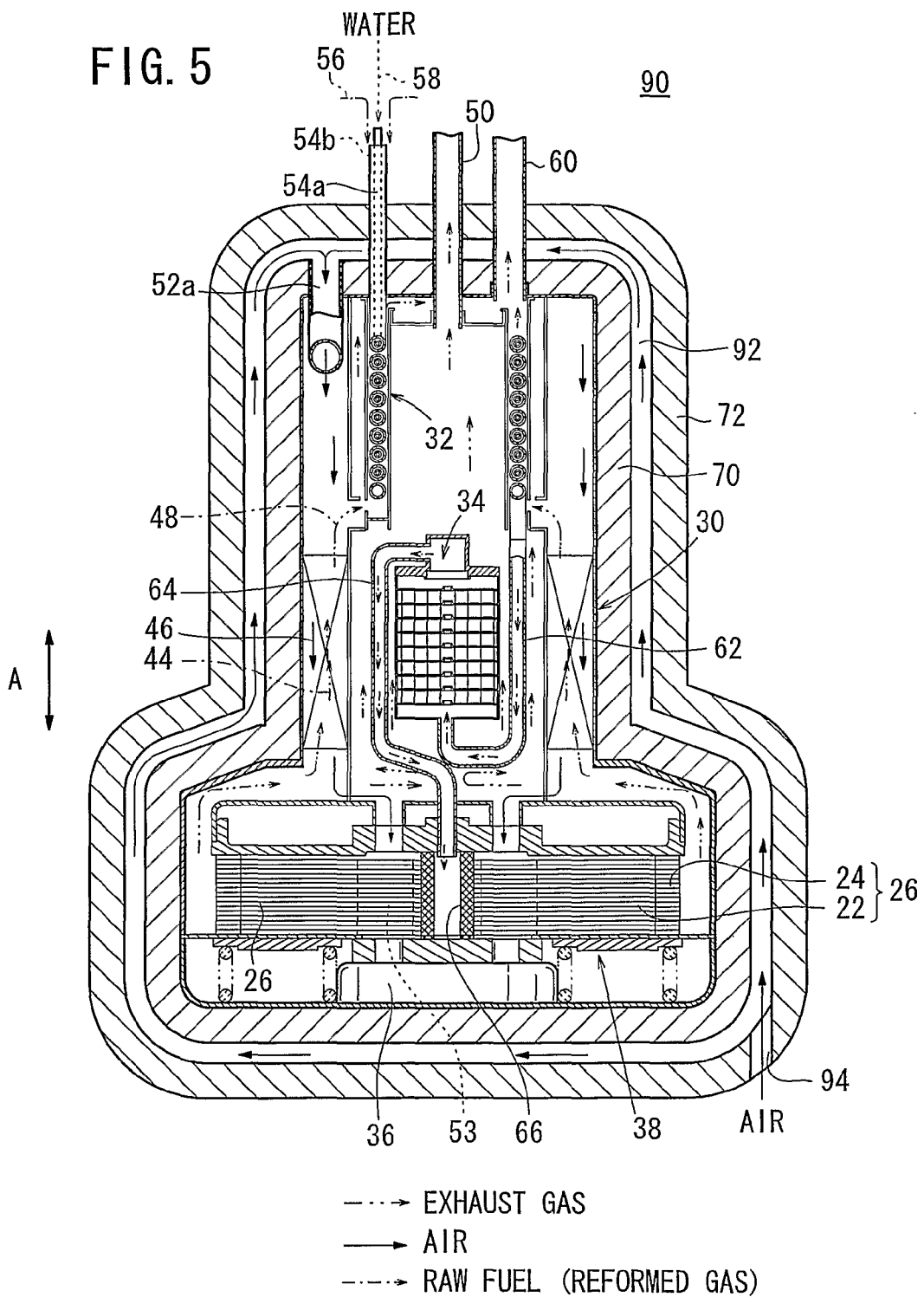
FIG. 5 is a cross sectional view showing a fuel cell module according to a third embodiment of the present invention.

FIG. 5 is a cross sectional view showing a fuel cell module 90 according to a third embodiment.

The fuel cell module 90 is surrounded by the inner heat insulating layer 70, the outer heat insulating layer 72, and a fluid channel 92 is formed between the inner heat insulating layer 70 and the outer heat insulating layer 72. Fluid which can absorb radiation of heat from the fuel cell module 90 such as the air (oxygen-containing gas) flows into the fluid channel 92 from a channel inlet 94 before the oxygen-containing gas is supplied to the heat exchanger 30.

The fluid channel 92 may be provided around the entire circumference of the fuel cell module 90. Alternatively, a plurality of separate fluid channels 92 may be provided. An air pipe 52a is connected to upper portion of the fluid channel 92. The air pipe 52a is connected to the air channel 46 of the heat exchanger 30.

In the third embodiment, the air flowing through the fluid channel 92 can effectively absorb heat which has not been thermally insulated by the inner heat insulating layer 70, and radiated from the inner heat insulating layer 70. Thus, it is possible to reliably achieve reduction of heat radiation from the fuel cell module 90, facilitate thermally self-sustaining operation, and improve the heat efficiency. Further, after the temperature of the air is raised by absorption of the radiated heat, the air is supplied to the heat exchanger 30 of the fuel cell module 90. Thus, without requiring the high performance and high efficiency of the heat exchanger 30, it is possible to simplify the heat exchanger 30, and achieve cost reduction of the heat exchanger 30.

Figure 6:
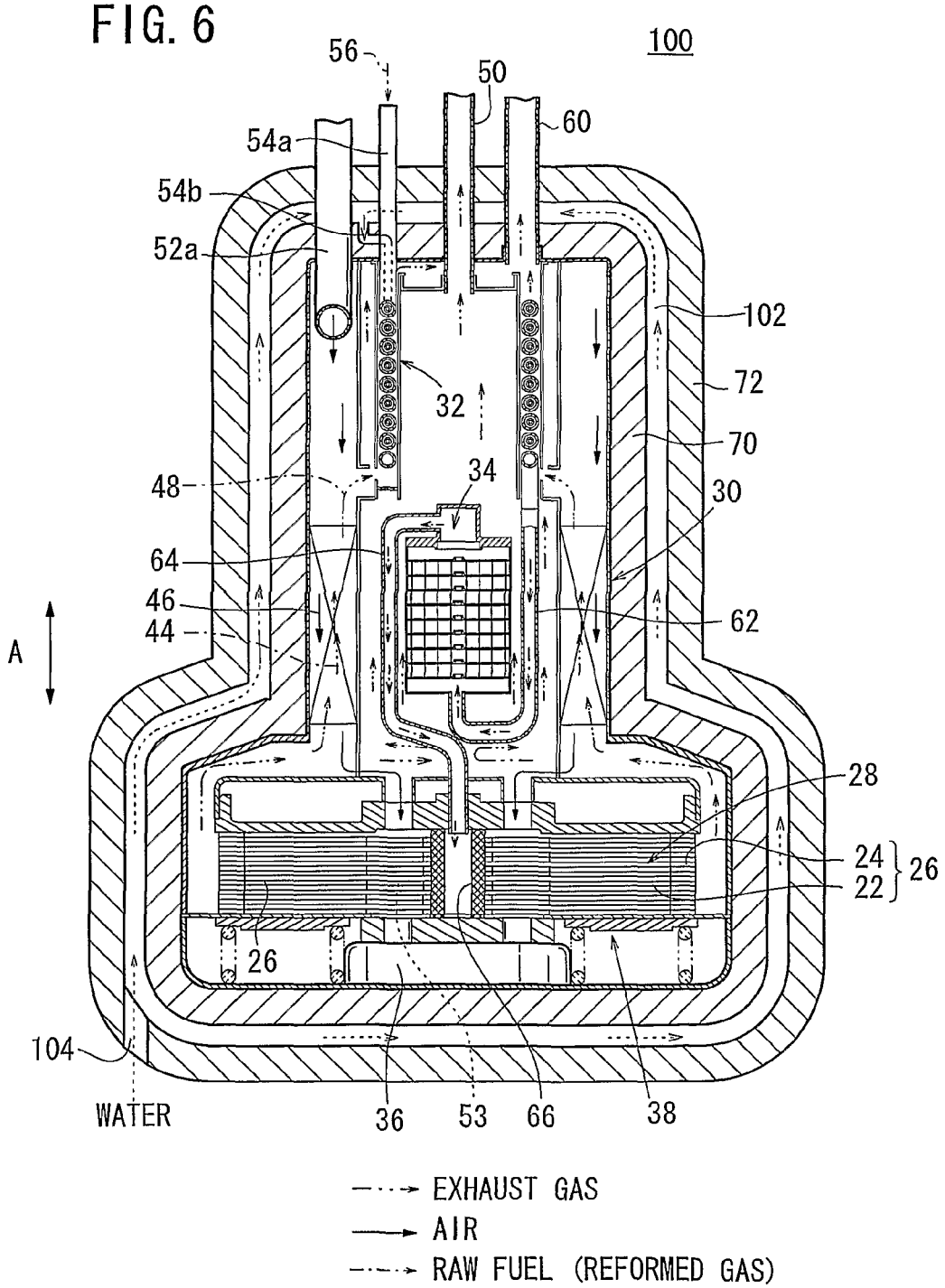
FIG. 6 is a cross sectional view showing a fuel cell module according to a fourth embodiment of the present invention.

FIG. 6 is a cross sectional view showing a fuel cell module 100 according to a fourth embodiment of the present invention.

The fuel cell module 100 is surrounded by the inner heat insulating layer 70, the outer heat insulating layer 72, and a fluid channel 102 is formed between the inner heat insulating layer 70 and the outer heat insulating layer 72. Fluid which can absorb radiation of heat from the fuel cell module 100 such as the water flows into the fluid channel 102 from a channel inlet 104 before the water is supplied to the evaporator 32. The inner pipe member 54b is connected to upper portion of the fluid channel 102.

In the fourth embodiment, the water flowing through the fluid channel 102 can effectively absorb heat which has not been thermally insulated by the inner heat insulating layer 70, and radiated from the inner heat insulating layer 70. Thus, it is possible to reliably achieve reduction of heat radiation from the fuel cell module 100, facilitate thermally self-sustaining operation, and improve the heat efficiency. Further, after the temperature of the water is raised by absorption of the radiated heat, the water is supplied to the evaporator 32 of the fuel cell module 100. Thus, without requiring the high performance and high efficiency of the evaporator 32, it is possible to simplify the evaporator 32, and achieve cost reduction of the evaporator 32.

Figure 7:
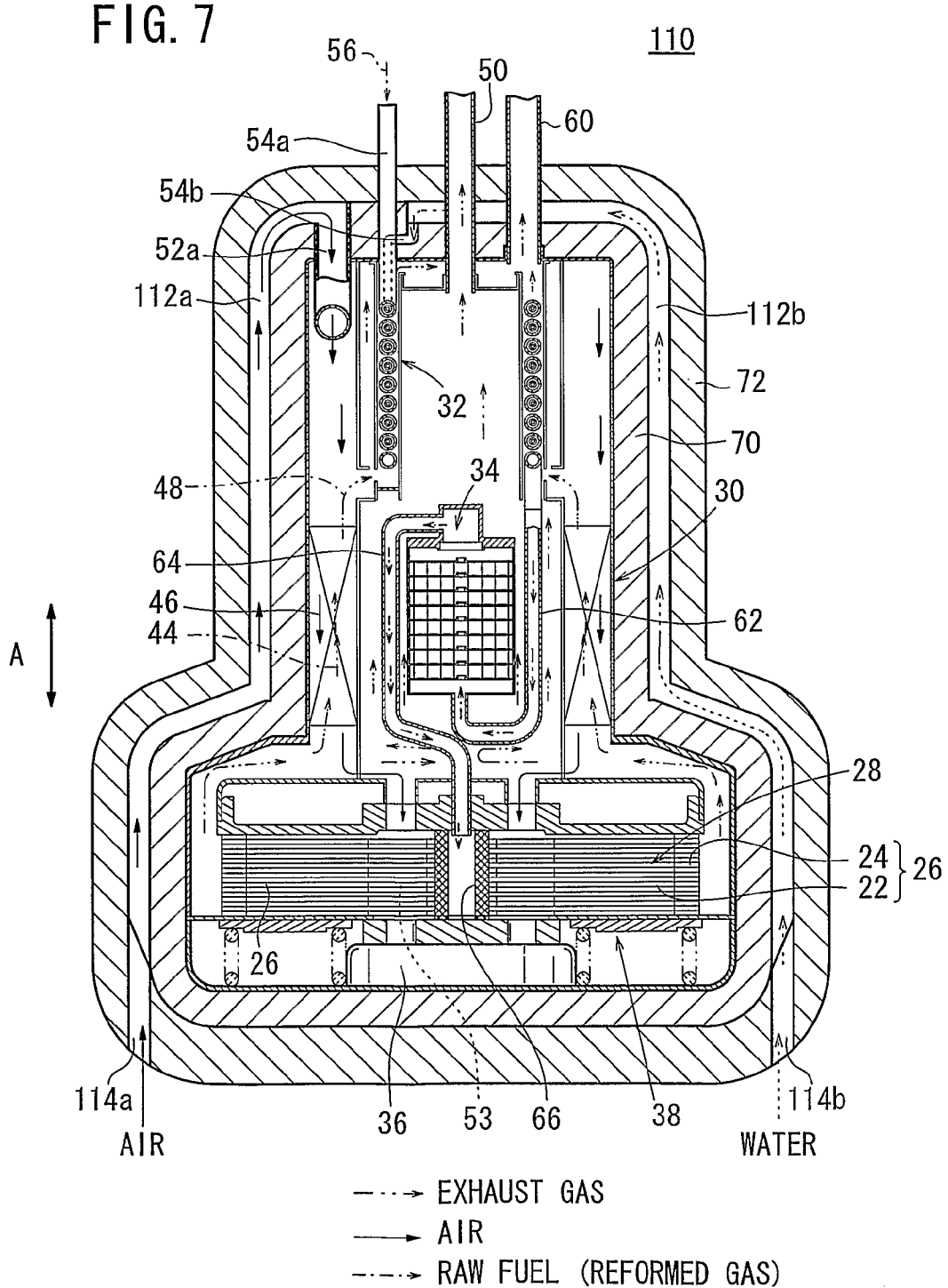
FIG. 7 is a cross sectional view showing a fuel cell module according to a fifth embodiment of the present invention.

FIG. 7 is a cross sectional view showing a fuel cell module 110 according to a fifth embodiment of the present invention.

The fuel cell module 110 is surrounded by the inner heat insulating layer 70 and the outer heat insulating layer 72. A first fluid channel 112a and a second fluid channel 112b are formed between the inner heat insulating layer 70 and the outer heat insulating layer 72. The air flows into the fluid channel 112a from a fluid inlet 114a before the air is supplied to the heat exchanger 30, and the water flows into the second fluid channel 112b from a fluid inlet 114b before the water is supplied to the evaporator 32.

In the fifth embodiment, the air and water heated by absorption of the radiated heat are supplied to the fuel cell module 110. In the structure, without requiring high performance and the efficiency for the heat exchanger 30 and the evaporator 32, it is possible to simplify the heat exchanger 30 and the evaporator 32, and achieve cost reduction of the heat exchanger 30 and the evaporator 32.

Figure 8:
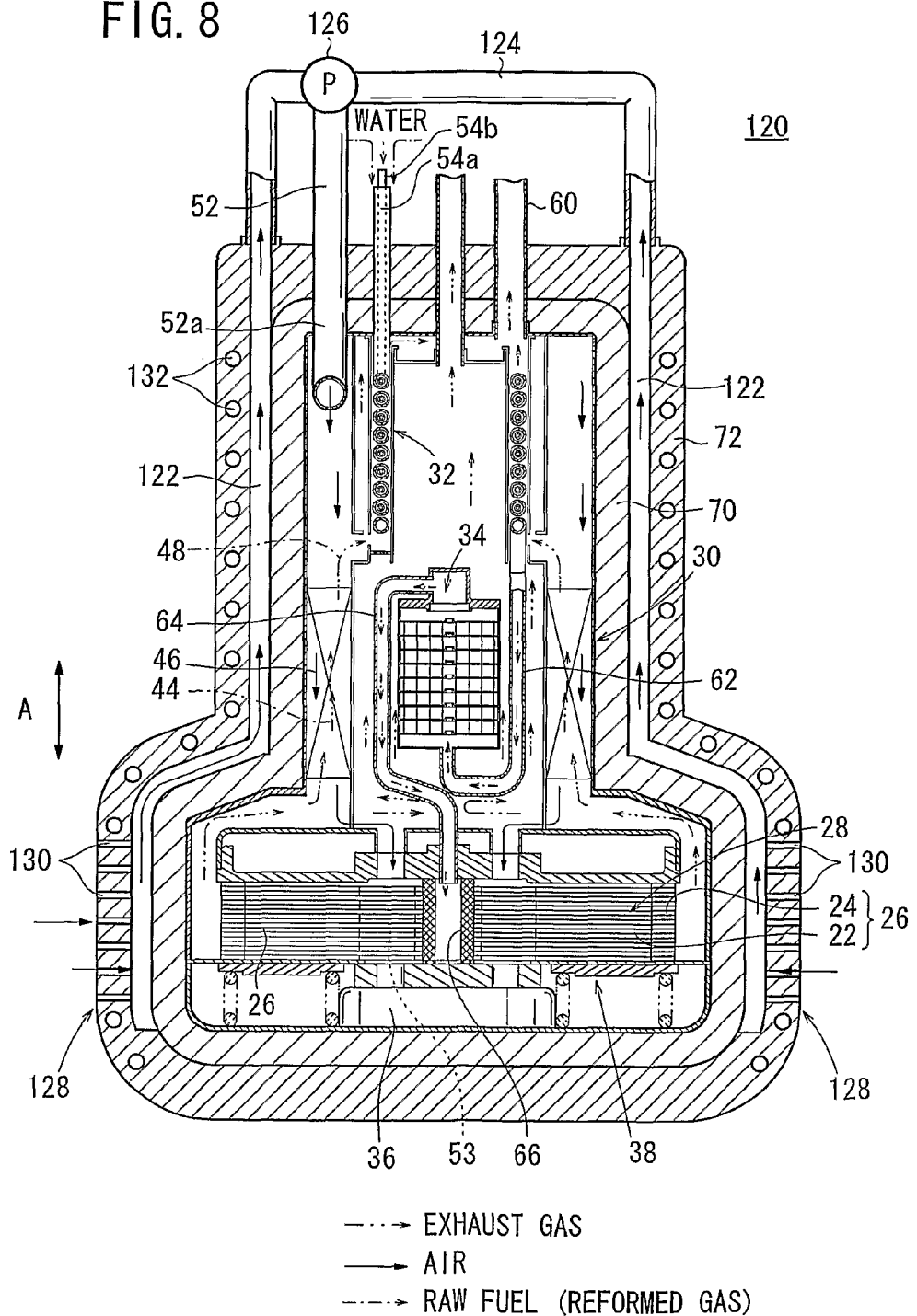
FIG. 8 is a cross sectional view showing a fuel cell module according to a sixth embodiment of the present invention.
Figure 9:
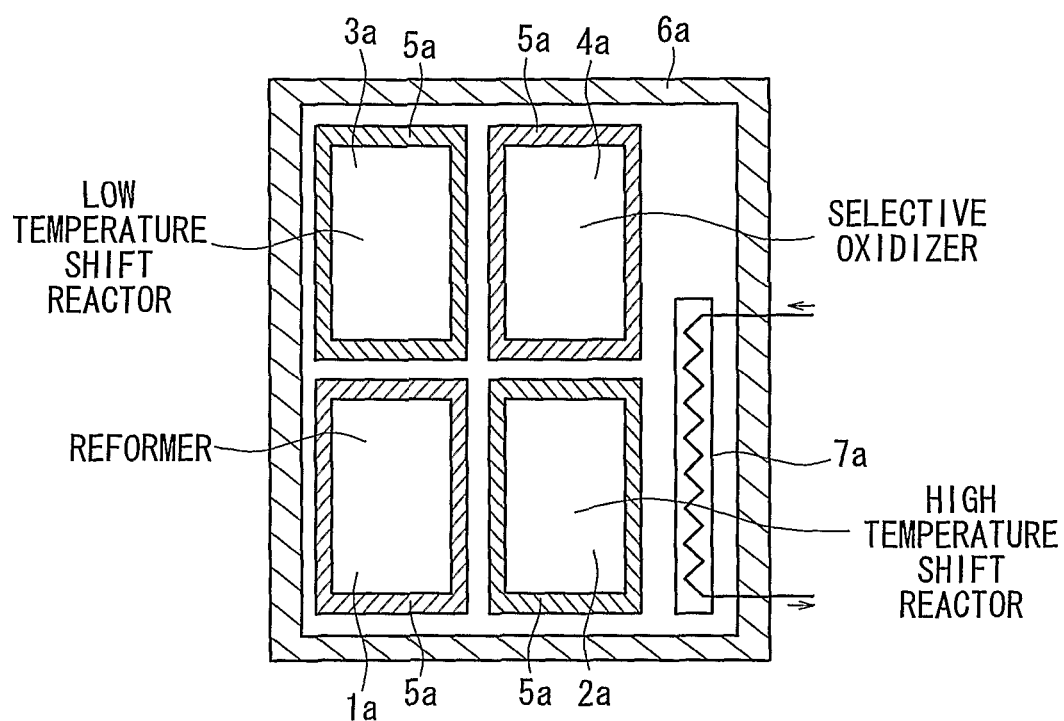
FIG. 9 is a view showing a fuel cell reforming system disclosed in Japanese Laid-Open Patent Publication No. 2001-068135.
Figure 10:
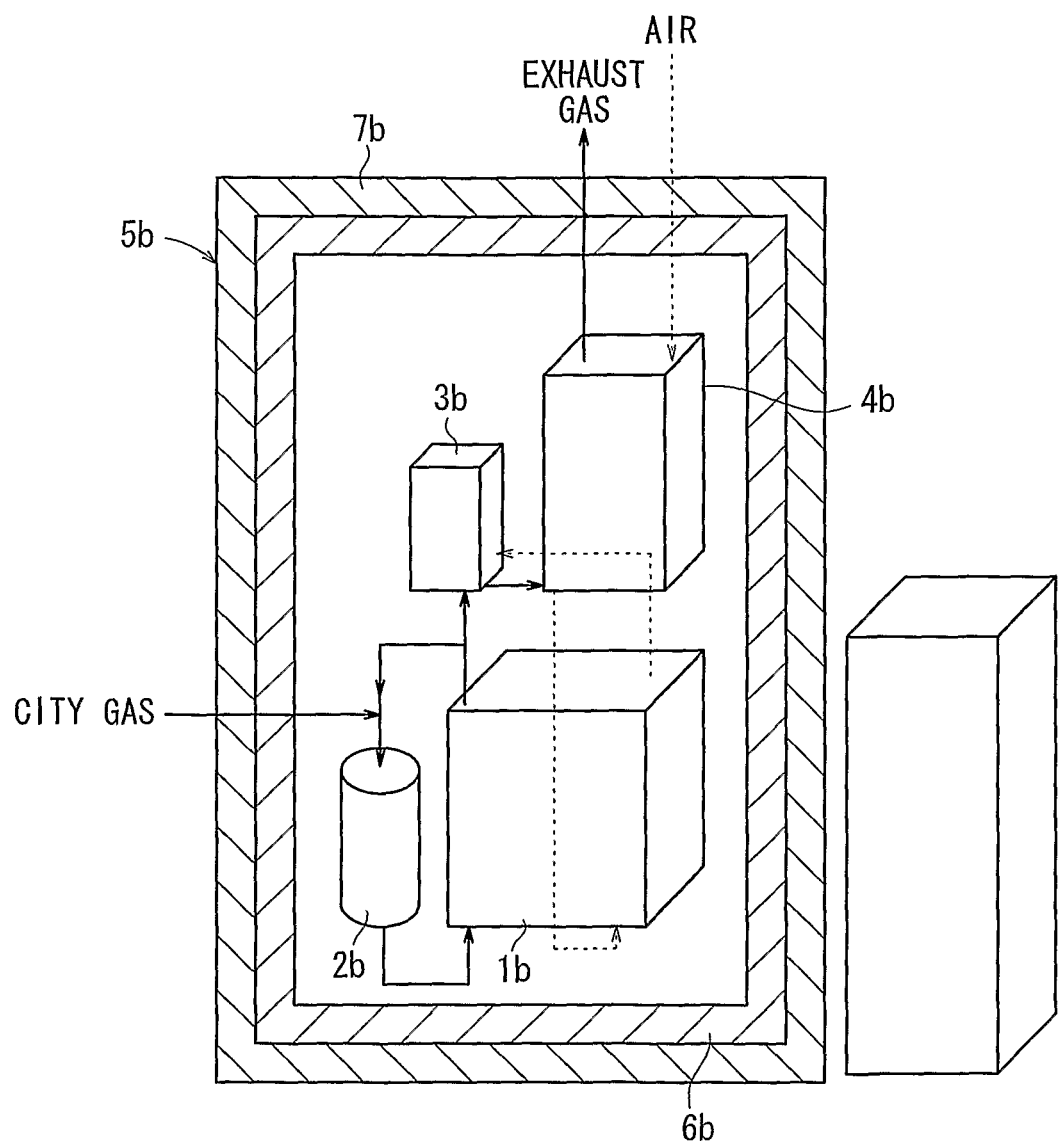
FIG. 10 is a view showing a fuel cell power generation system disclosed in Japanese Laid-Open Patent Publication No. 2004-087362.
Figure 11:
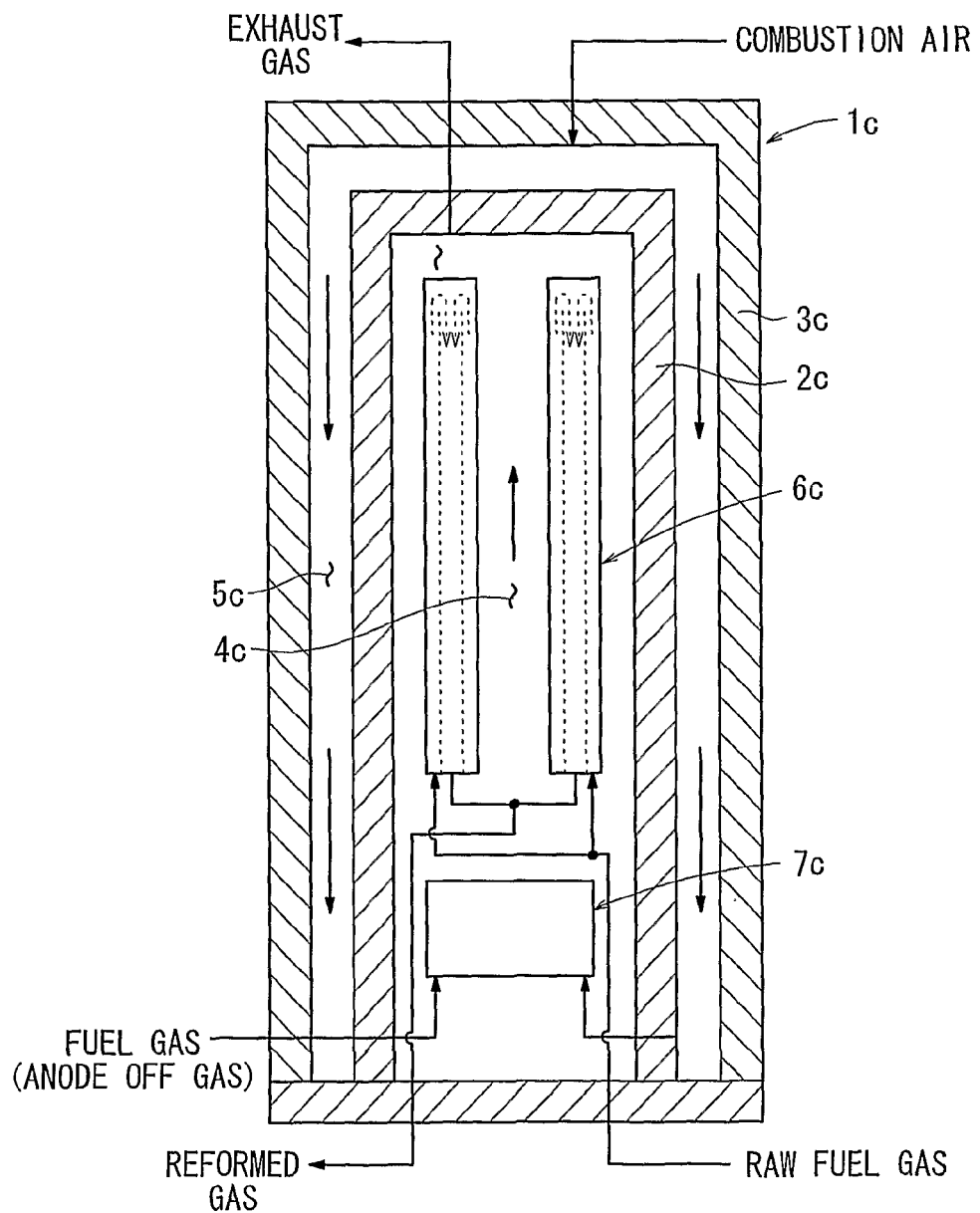
FIG. 11 is a view showing heat insulating container structure disclosed in Japanese Laid-Open Patent Publication No. 2005-194123.

FIG. 8 is a cross sectional view showing a fuel cell module 120 according to a sixth embodiment of the present invention.

The fuel cell module 120 is surrounded by the inner heat insulating layer 70 and the outer heat insulating layer 72. A plurality of fluid channels 122 are formed between the inner heat insulating layer 70 and the outer heat insulating layer 72. Lower ends of the respective fluid channels 122 are closed, and upper ends of the fluid channels 122 are connected to a pump 126 through a pipe 124. The air supply pipe 52 is provided at the outlet of the pump 126.

A filter 128 is provided in part of the outer heat insulating layer 72. The filter 128 includes a plurality of filter holes 130 at lower portion of the outer heat insulating layer 72, for connecting the fluid channels 122 to the outside. A water channel 132 is formed around in the outer heat insulating layer 72, other than the filter 128. For example, the water channel 132 may be connected to the water channel 58 through the inner pipe member 54b.

In the sixth embodiment, by sucking operation of the pump 126, the air is sucked into the fluid channel 122 from the outside through the filter holes 130 of the filter 128. When the air flows through the fluid channels 122, the air is heated by absorbing the radiated heat. Then, the air is supplied to the fuel cell module 120 through the air supply pipe 52. In the structure, without requiring the high performance and high efficiency of the heat exchanger 30, it is possible to simplify the heat exchanger 30, and achieve cost reduction of the heat exchanger 30.

Further, the air sucked into the fluid channel 122 passes through the filter 128. Thus, no foreign material such as dust particles enters the fuel cell module 120, and clogging due to the foreign material does not occur. It is possible to suppress increase in the pressure loss. Further, by water flowing through the water channel 132 provided in the outer heat insulating layer 72, it is possible to suitably collect the radiated heat, and achieve improvement in heat efficiency.

Although the invention has been particularly shown and described with reference to preferred embodiments, it will be understood that variations and modifications can be effected thereto by those skilled in the art without departing from the spirit and scope of the invention as defined by the appended claims.

The invention claimed is:
1. A fuel cell module comprising:
a fuel cell stack formed by stacking a plurality of fuel cells, the fuel cells each formed by stacking an electrolyte electrode assembly and a separator, the electrolyte elec- trode assembly including an anode, a cathode, and an electrolyte interposed between the anode and the cathode;

a heat exchanger for heating an oxygen-containing gas before the oxygen-containing gas is supplied to the fuel cell stack;

an evaporator for producing a mixed fuel of a raw fuel chiefly containing hydrocarbon and water vapor obtained by evaporating water;

a reformer for producing a reformed gas by reforming the mixed fuel; and a combustor for at least heating any of the fuel cell stack, the heat exchanger, the evaporator, and the reformer, wherein the fuel cell module is surrounded by a housing formed of a plurality of heat insulating layers, the heat insulating layers include an inner heat insulating layer and an outer heat insulating layer, the inner heat insulating layer is higher in metal content than the outer heat insulating layer, and the outer heat insulating layer forms an external surface of the housing.

2. A fuel cell module according to claim 1, wherein the inner heat insulating layer is made of dense material in comparison with the outer heat insulating layer.

3. A fuel cell module according to claim 1, wherein a metal plating layer is provided on an inner surface of the inner heat insulating layer.

4. A fuel cell module according to claim 1, wherein a fluid channel is formed between the inner heat insulating layer and the outer heat insulating layer; and a fluid which is capable of absorbing heat radiated from the fuel cell module flows through the fluid channel.

5. A fuel cell module according to claim 4, wherein the fluid is an oxygen-containing gas before being supplied to the heat exchanger.

6. A fuel cell module according to claim 4, wherein the fluid is the water before being supplied to the evaporator.

7. A fuel cell module according to claim 1, wherein a first fluid channel and a second fluid channel are formed between the inner heat insulating layer and the outer heat insulating layer;

an oxygen-containing gas flows through the first fluid channel before the oxygen-containing gas is supplied to the heat exchanger; and the water flows through the second fluid channel before the water is supplied to the evaporator.

8. A fuel cell module according to claim 4, wherein a filter is provided in part of the outer heat insulating layer; and the filter has a filter hole for filtering the fluid before the fluid is supplied to the fluid channel.

9. A fuel cell module according to claim 1, wherein the fuel cell is a solid oxide fuel cell.

* * * * *